United States Patent [19]
Aizawa et al.

[11] Patent Number: 5,488,520
[45] Date of Patent: Jan. 30, 1996

[54] DATA RECORDING AND PLAYBACK APPARATUS USING HELICAL SCAN SYSTEM WITH MAGNETIC HEAD FOR RECORDING AND PLAYING BACK PATTERN SIGNAL FOR TRACKING IN TRACKING AREA WITHIN HELICAL TRACK

[75] Inventors: Toshiro Aizawa, Ebina; Shigemitsu Higuchi, Fujisawa, both of Japan

[73] Assignee: Hitachi, Ltd., Tokyo, Japan

[21] Appl. No.: 70,625

[22] Filed: Jun. 2, 1993

[30] Foreign Application Priority Data

Jun. 2, 1992 [JP] Japan ................................. 4-141745

[51] Int. Cl.⁶ .......................... G11B 5/584; G11B 5/58; G11B 15/14
[52] U.S. Cl. ................... 360/77.12; 360/77.01; 360/64; 360/70
[58] Field of Search .................. 360/77.12, 77.01, 360/73.11, 78.02, 75, 18, 27, 64, 70, 71, 73.13, 18, 77.13

[56] References Cited

U.S. PATENT DOCUMENTS 3,665,118  5/1972  Cooper, Jr. ........................ 360/27
3,931,639  1/1976  Arter et al. .................... 360/73.04 X
4,490,756  12/1984  Dost et al. ........................ 360/77.11
4,755,893  7/1988  Yamada et al. ..................... 360/18
4,823,206  4/1989  Nemeto et al. .................... 360/27 X
4,843,491  6/1989  Otokawa ........................ 360/73.05 X
4,954,902  9/1990  Furuhata et al. .................. 360/10.2
5,008,763  4/1991  Horino .......................... 360/75 X
5,270,873  12/1993  Sakai et al. .................... 360/73.11 X
5,296,976  3/1994  Takayama et al. ............... 360/77.15 X

OTHER PUBLICATIONS

ITEJ Technical Report vol. 11, No. 24, pp. 13–18, VR'87–30, (Oct., 1987), K. Inagaki, "Design Considerations for the D–2 NTSC Composite DVTR".

Primary Examiner—Aristotelis Psitos
Assistant Examiner—Varsha A. Kapadia
Attorney, Agent, or Firm—Antonelli, Terry, Stout & Kraus

[57] ABSTRACT

Recording areas for tracking on which specific servo patterns are recorded are provided preceding data tracks on which data is to be recorded on a recording tape scanned by a helical scan system. The data tracks and recording areas for tracking are recorded at different azimuths. At the time of a playback operation, etc., the specific patterns in the recording areas for tracking are played back by the helical scan system and tracking is performed by using the playback timing.

23 Claims, 12 Drawing Sheets

DATA RECORDING AND PLAYBACK APPARATUS USING HELICAL SCAN SYSTEM WITH MAGNETIC HEAD FOR RECORDING AND PLAYING BACK PATTERN SIGNAL FOR TRACKING IN TRACKING AREA WITHIN HELICAL TRACK

BACKGROUND OF THE INVENTION

1. Field of the Invention

This invention relates to a data recording and playback apparatus using a helical scan system for recording and playing back data on magnetic tape, and more particularly to tracking technologies thereof.

2. Description of the Related Art

A conventional data recording and playback apparatus for recording and playing back general digital data on magnetic tape adopts a recording system with fixed heads. However, in recent years, the necessity for increasing the storage capacity of magnetic tape has been raised and it is expected to provide a data recording and playback apparatus adopting a helical scan system which can record a larger amount of data on magnetic tape than the fixed head recording and playback system.

The helical scan system is a recording system widely adopted for video tape recorders (VTRs). With general VTRs, control tracks scanned by a linear scan system are provided on magnetic tape besides video tracks scanned by the helical scan system. When data is recorded on the video tracks, a signal indicating a reference timing is recorded on the control track. At a time of playback, the signal on the control track is played back in parallel with the playing-back of the signals on the video tracks and a reel and capstan are controlled based on the reference signal playback timing and a head cylinder rotation phase, thereby tracking the video tracks. In VTRs such as the type C standardized by the SMPTE (Society of Motion Picture and Television Engineers), tracking is performed using a dither method by which a track shift and shift direction are determined in response to the amount of the drop in a level of a playback signal when a head is moved only a little.

The D2 format digital video tape recorder (DVTR) standardized by the SMPTE is known as an apparatus using the helical scan system for recording digital video data on magnetic tape. Such a DVTR is described in ITEJ Technical Report, Vol.11, No. 24, pp. 13–18, VR' 87–30 (October 1987), etc.

When general digital data is recorded and played back, the reliability of data being recorded and played back is required to be higher than that of data for VTRs. Therefore, recording and playback in a recording format which can secure more accurate tracking and higher reliability than those of VTRs are required to provide a data recording and playback apparatus using the helical scan system for recording digital data. On the other hand, to store a larger amount of data on magnetic tape, it is desired to eliminate linear tracks for tracking, such as the control tracks, in order to be able to use the linear track area as a recording area for digital data.

SUMMARY OF THE INVENTION

Accordingly, it is an object of the invention to provide a data recording and playback apparatus using the helical scan system which can record and play back general digital data on magnetic tape at high density and high reliability without using linear tracks for tracking.

To these ends, according to a first embodiment of the invention, there is provided a data recording and playback apparatus using a helical scan system for recording and playing back data on a magnetic tape with a rotary head cylinder, the apparatus comprising a magnetic head on the rotary head cylinder for scanning a recording track used for tracking on the magnetic tape, a recording magnetic head on the rotary head cylinder for scanning a data track which is a track within the recording track area used for tracking, a playback magnetic head on the rotary head cylinder for scanning the data track, means for recording a specific pattern in a predetermined area of the recording track used for tracking by the magnetic head when data is recorded, means for recording data by the recording magnetic head in the data track not overlapping the area in which the specific pattern is recorded within the recording track area used for tracking whose scanning by the magnetic head terminates when data is recorded, means for detecting a predetermined state related to a rotation phase of the rotary head cylinder, means for playing back the data on the data track by the playback magnetic head in a data playback operation, means, when the recording track used for tracking having the prerecorded specific pattern is scanned, for playing back the specific pattern on the recording track used for tracking by the magnetic head, and tracking control means being responsive to the playback timing of the specific pattern played back and the predetermined state related to the rotation phase of the rotary head cylinder for controlling tracking of the magnetic head and the recording and playback magnetic heads.

The data recording and playback apparatus according to the invention uses a recording format having a recording track used for tracking and a data track which is a track provided within the recording track area used for tracking. When recording data, the apparatus records a specific pattern in a predetermined area of the recording track used for tracking by the magnetic head, and records data by the recording magnetic head in the data track not overlapping the area in which the specific pattern is recorded within the recording track area used for tracking whose scanning by the magnetic head terminates.

To process the recording track used for tracking on which the specific pattern is already recorded, the apparatus plays back the specific pattern on the recording track used for tracking by the magnetic head, and in response to the playback timing of the specific pattern played back and the predetermined state related to the rotation phase of the rotary head cylinder, controls tracking of the magnetic head and the recording and playback magnetic heads.

Therefore, general digital data can be recorded on magnetic tape at high density by the helical scan system and tracking is enabled without using linear tracks for tracking.

DESCRIPTION OF THE PREFERRED EMBODIMENTS

Referring now to the accompanying drawings, there is shown a data recording and playback apparatus according to an embodiment of the invention.

Figure 1:
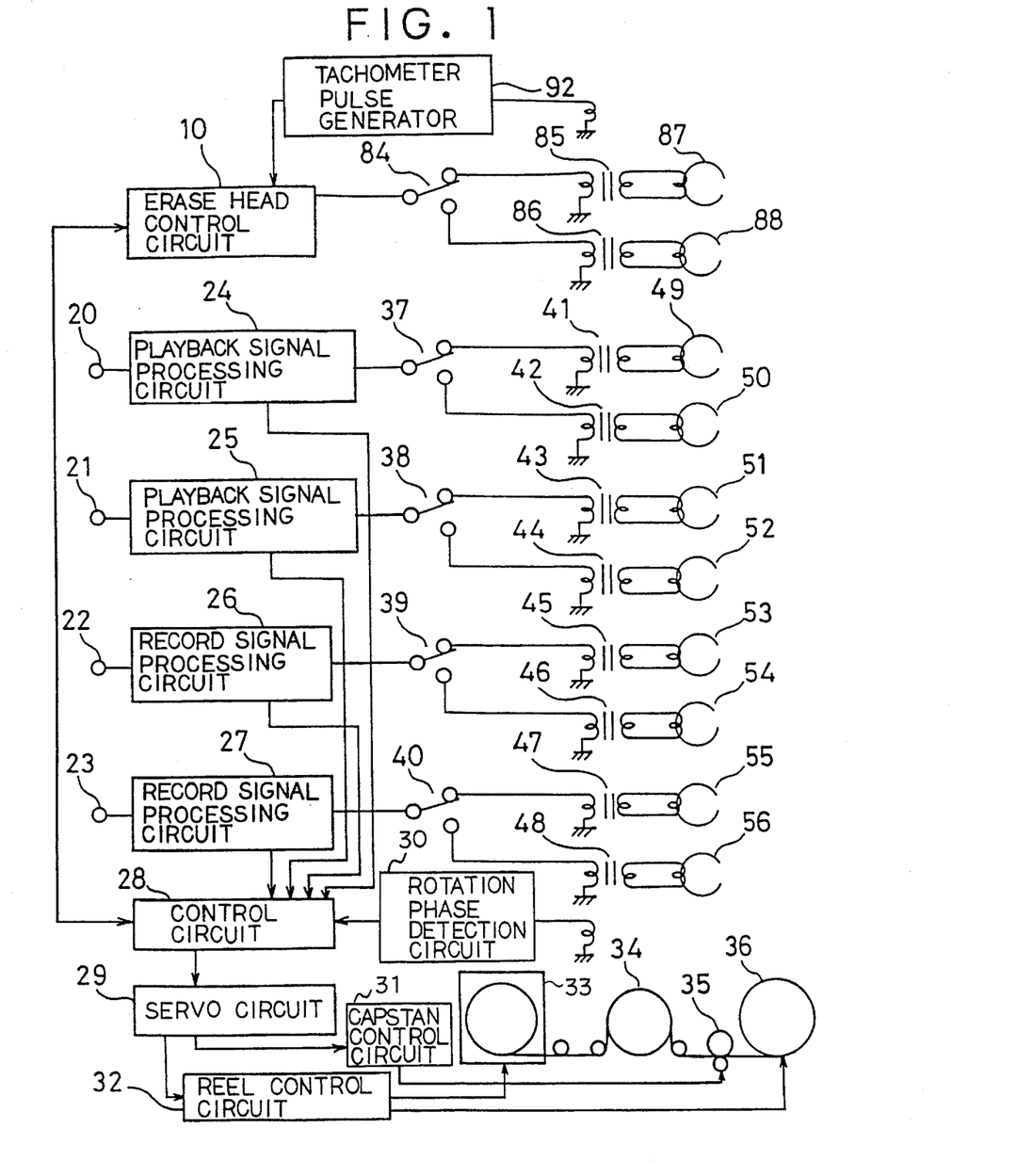
FIG. 1 shows the configuration of a data recording and playback apparatus according to an embodiment of the invention.

First, FIG. 1 shows the configuration of the data recording and playback apparatus according to the embodiment, wherein numerals 22 and 23 are record signal input terminals, numerals 26 and 27 are record signal processing circuits, numerals 37 to 40 and 84 are change-over switches, numerals 41 to 48 and 85 and 86 are rotary transformers, numerals 53 to 56 are recording heads, numerals 49 to 52 are playback heads, numerals 24 and 25 are playback signal processing circuits, numerals 20 and 21 are playback signal output terminals, numeral 28 is a control circuit, numeral 29 is a servo circuit, numeral 30 is a rotation phase detection circuit, numeral 31 is a capstan control circuit, numeral 32 is a reel control circuit, numeral 34 is a rotary head cylinder, numeral 33 is a recording tape supply mechanism, numeral 36 is a recording tape take-up mechanism, numeral 35 is a capstan, numerals 87 and 88 are flying erase heads, numeral 92 is a tachometer pulse generator, and numeral 10 is an erase head control circuit.

Figure 2:
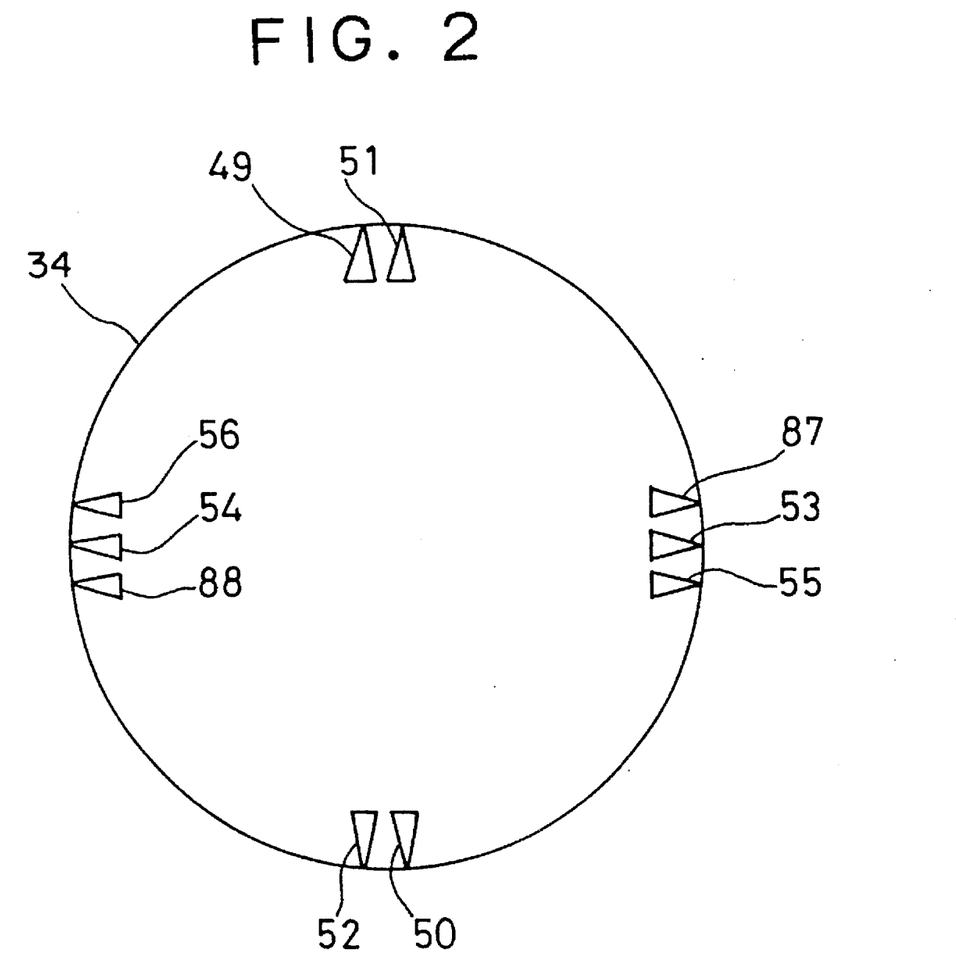
FIG. 2 shows positional relationships between heads.

Next, FIG. 2 shows the positional relationships between the heads used with the data recording and playback apparatus according to the embodiment of the invention, wherein numeral 34 is a rotary head cylinder with heads (a scanner), numerals 49 to 52 are playback heads, numerals 53 to 56 are recording heads, and numerals 87 and 88 are flying erase heads. The azimuth of each of the flying erase heads 87 and 88 is 0 degrees. The azimuths of the playback heads 49 and 50 and the recording heads 53 and 54 are different from those of the playback heads 51 and 52 and the recording heads 55 and 56 (not 0 degrees).

With the data recording and playback apparatus, data input through the record signal input terminals 22 and 23 is converted into a recording format on a recording tape by the record signal processing circuits 26 and 27, and the resultant signals are distributed by the change-over switches 39 and 40 alternately for each track. Then, the distributed signals are fed via the rotary transformers 45–48 into the recording heads 53–56 for recording onto the tape. The signals recorded on the tape are reproduced by the playback heads 49–52 and fed through the rotary transformers 41–44 and the change-over switches 37 and 38 into the playback signal processing circuits 24 and 25 which then restore the received signals to the original data for outputting from the playback signal output terminals 20 and 21.

Figure 3:
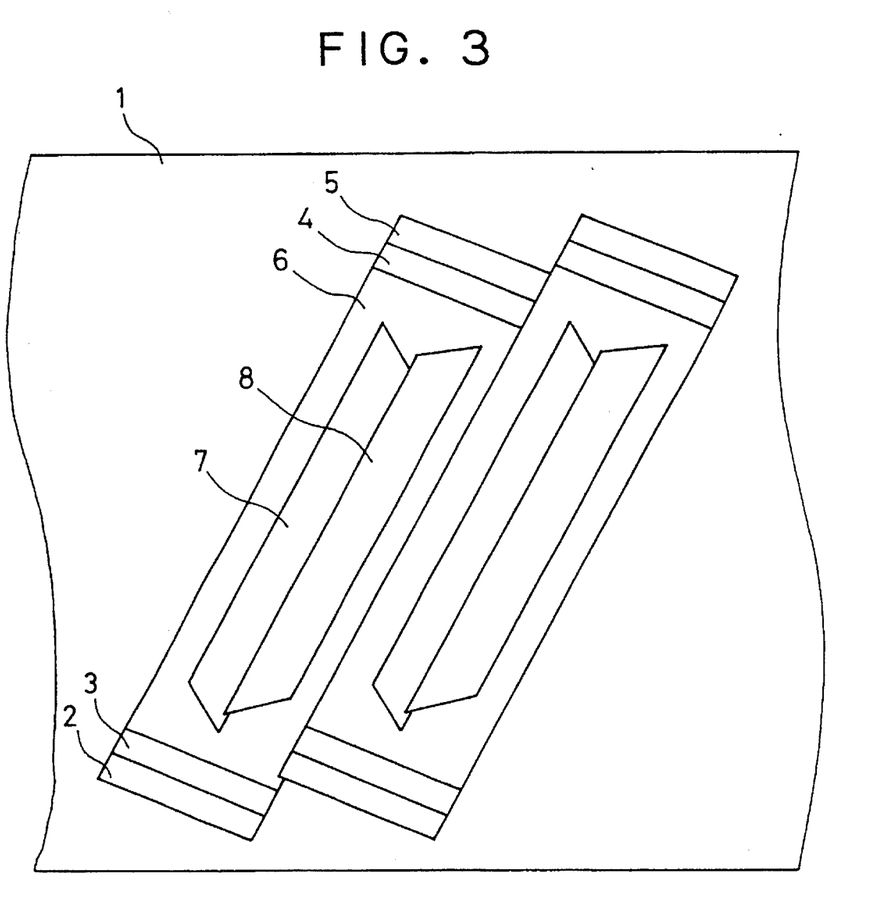
FIG. 3 shows a data recording format.

Next, FIG. 3 shows the recording format of the data recording and playback apparatus according to the embodiment, wherein numeral 1 is recording tape, numerals 2–5 are recording areas for tracking, numeral 6 is a recording area for flying erase, and numerals 7 and 8 are data tracks. The recording areas for tracking 2–5 and the recording area for flying erase 6 make up a recording track for tracking. This recording track which is for tracking is scanned by the flying erase head. The data tracks 7 and 8 are scanned by the recording and playback heads. That is, two data tracks are formed within the recording track for tracking.

The operation of generating the track pattern shown in FIG. 3 is described below.

To record data on the recording tape 1, first the recording track for tracking is generated by using the flying erase head preceding the recording heads. A specific servo pattern for magnetic head tracking is recorded in the recording area for tracking 2 at the entrance of the recording track for tracking at an azimuth of 0 degrees. Likewise, a specific servo pattern for tracking which is different from the specific servo pattern recorded in the recording area for tracking 2 is recorded in the recording area for tracking 3 at an azimuth of 0 degrees. Next, a flying erase signal is recorded in the recording area for flying erase 6 of the recording track for tracking. This signal is intended to erase data recorded on the data tracks within the recording area for flying erase 6. The number of data errors or the error rate can be reduced by recording this flying erase signal. Last, specific tracking pattern signals are recorded in the recording areas for tracking 4 and 5 as in the recording areas for tracking 2 and 3. The signals recorded in the recording areas for tracking 4 and 5 may be the same as those recorded in the recording areas for tracking 2 and 3. The recording areas for tracking 4 and 5 may also be omitted.

On the other hand, after the signals are recorded on the recording track for tracking by the flying erase head, data is written in parallel onto the two data tracks 7 and 8 within the recording area for flying erase 6 by the two recording heads disposed close together and following the flying erase head at azimuths different from each other (which are also different from the azimuth for recording on the recording track for tracking), thereby reducing crosstalk between the various tracks at the time of playback. Further, data can be recorded so as to provide a guard band between the data track pair and its contiguous data track pair for lowering the data error rate.

The operation of generating the recording format shown in FIG. 3 is now complete.

At playback, the data recorded on the two data tracks within the recording area for flying erase is read in parallel at different azimuths for each data track (which are also different from the azimuth for the recording track for tracking) by the two playback heads disposed close together.

At recording and playback, the signals recorded on the recording track for tracking are read by the flying erase head, based on which tracking is performed as described below. The operation of the flying erase head is controlled by the erase head control circuit 10. The recording of signals by the recording heads is controlled by the record signal processing circuits 26 and 27. The reading of signals by the playback heads is controlled by the playback signal processing circuits 24 and 25.

Now, the playback signal processing circuits 24 and 25, the record signal processing circuits 26 and 27, the erase head control circuit 10, and the tracking operation will be described in detail.

First, the record signal processing circuit will be described.

Figure 4:
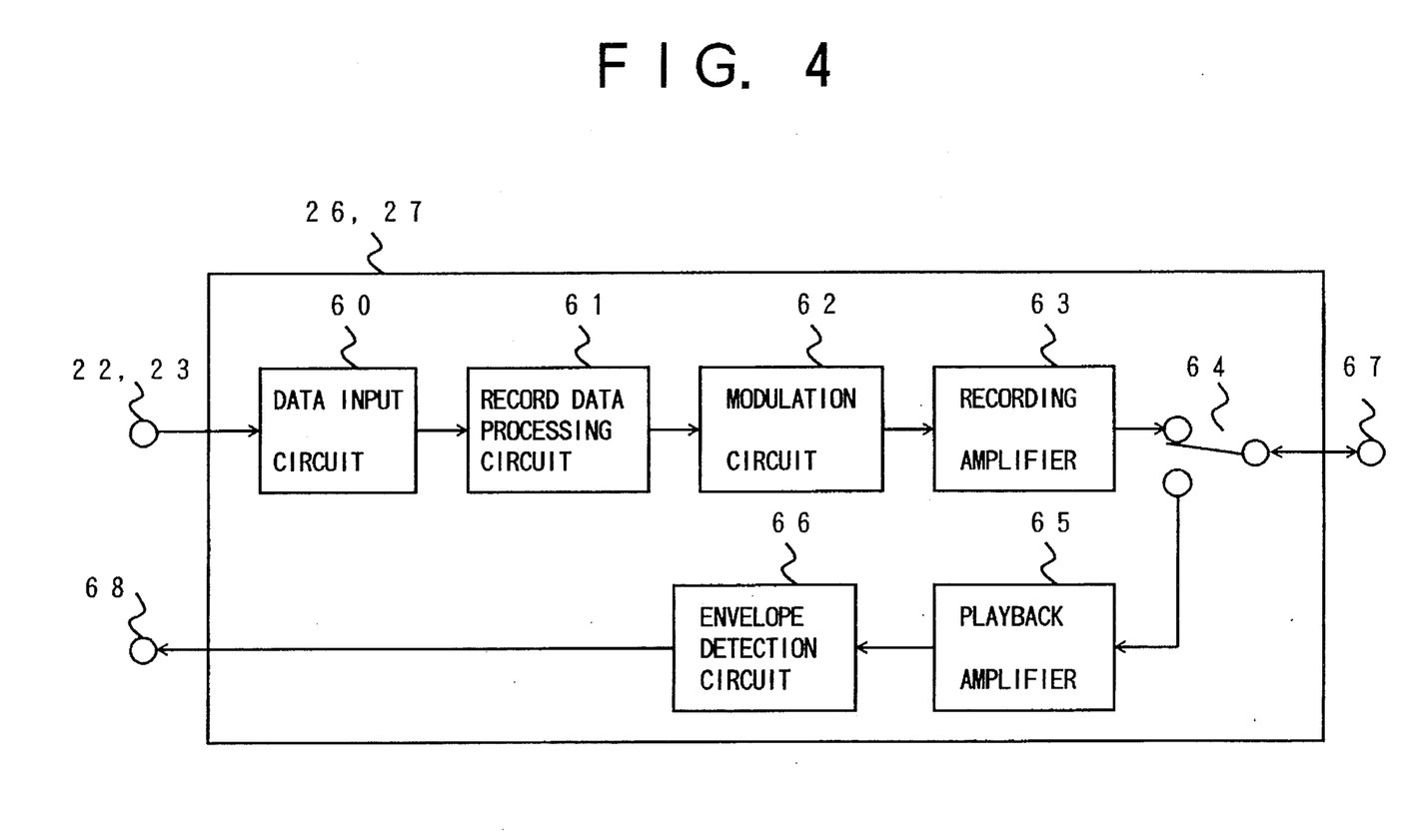
FIG. 4 shows a block diagram of a record signal processing circuit.

FIG. 4 shows a block diagram of the record signal processing circuit 26, 27, wherein numeral 60 is a data input circuit, numeral 61 is a record data processing circuit, numeral 62 is a modulation circuit, numeral 63 is a recording amplifier, numeral 64 is a recording and playback change-over switch, numeral 65 is a playback amplifier, numeral 66 is an envelope detection circuit, numeral 67 is a record signal processing circuit input/output terminal, and numeral 68 is a recording head signal playback output terminal.

When the recording operation is performed, data input through the record signal input terminal 22, 23 is fed into the data input circuit 60 and then undergoes shuffling, etc., in the record data processing circuit 61. The data is then modulated by the modulation circuit 62. The modulated signal is amplified by the recording amplifier 63 for outputting through the recording and playback change-over switch 64 and the record signal processing circuit input/output terminal 67 to the recording head.

When a tracking operation is performed before the recording operation, any previously recorded signal is reproduced by the recording head. The reproduced signal is input through the record signal processing circuit input/output terminal 67 and fed via the recording and playback change-over switch 64 into the playback amplifier 65 for amplification. From the amplified signal, the envelope detection circuit generates an envelope signal which is then output through the recording head signal playback output terminal 68 to the control circuit 28.

Next, the playback signal processing circuit will be described in detail.

Figure 5:
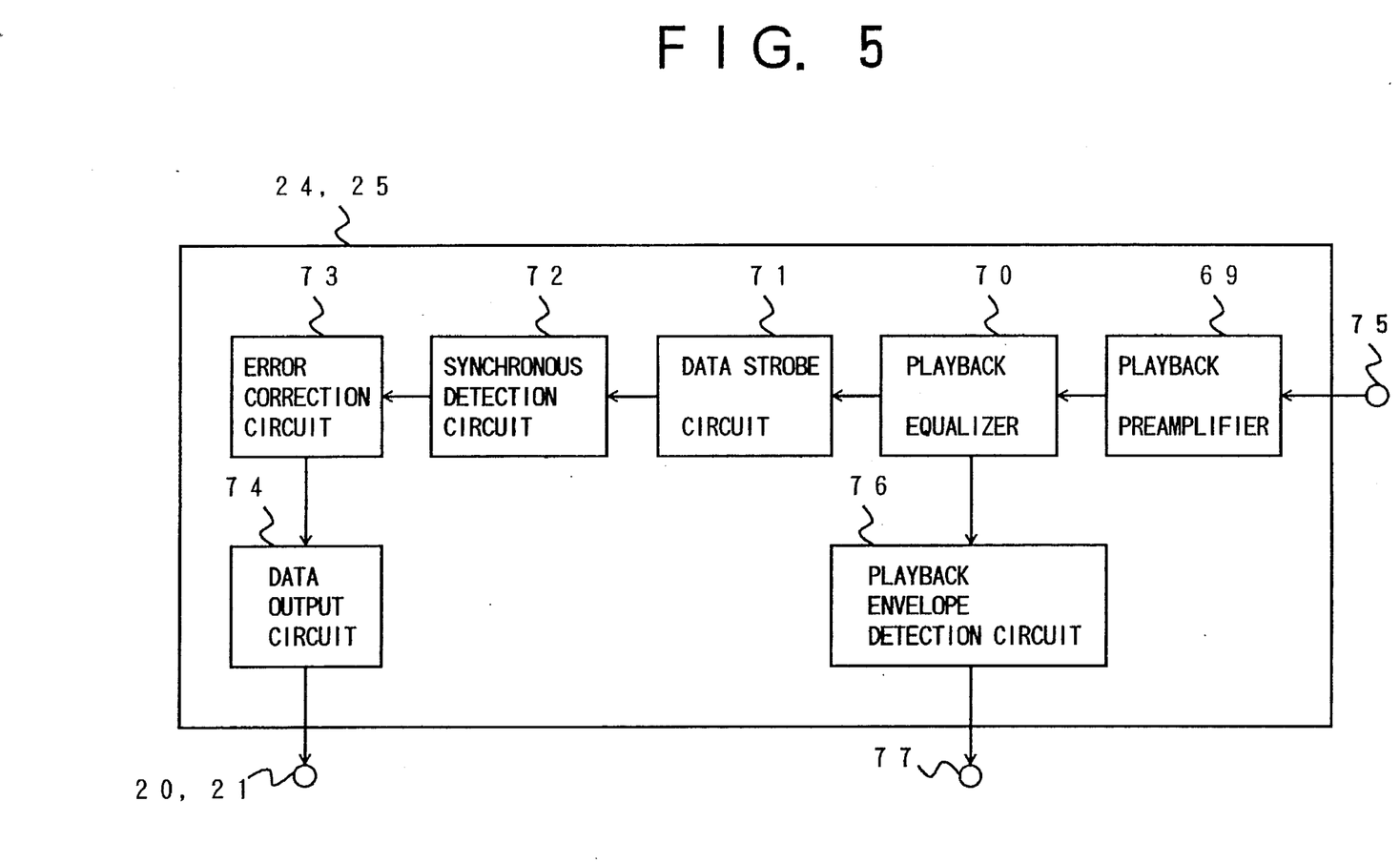
FIG. 5 shows a block diagram of a playback signal processing circuit.

FIG. 5 shows a block diagram of the playback signal processing circuit 24, 25, wherein numeral 69 is a playback preamplifier, numeral 70 is a playback equalizer, numeral 71 is a data strobe circuit, numeral 72 is a synchronous detection circuit, numeral 73 is an error correction circuit, numeral 74 is a data output circuit, numeral 75 is a playback signal processing circuit input terminal, numeral 76 is a playback envelope detection circuit, and numeral 77 is a playback envelope detection circuit signal output terminal.

At the time of playback operation, a signal input through the playback signal processing circuit input terminal 75 from the playback head is amplified by the playback preamplifier 69. The waveform of the amplified signal is shaped by the playback equalizer 70 and the resultant signal is determined by the data strobe circuit 71 to either contain or be free of errors. The synchronous detection circuit 72 performs synchronous detection. Then, the data judged by the data strobe circuit 71 is corrected by the error correction circuit 73. After the correction, the data is output through the data output circuit 74 from the playback signal output terminal 20, 21. From the signal whose waveform is shaped by the playback equalizer 70, the playback envelope detection circuit 76 generates an envelope detection signal which is then output through the playback envelope detection circuit output terminal 77 to the control circuit 28.

Next, the erase head control circuit 10 will be described in detail.

Figure 6:
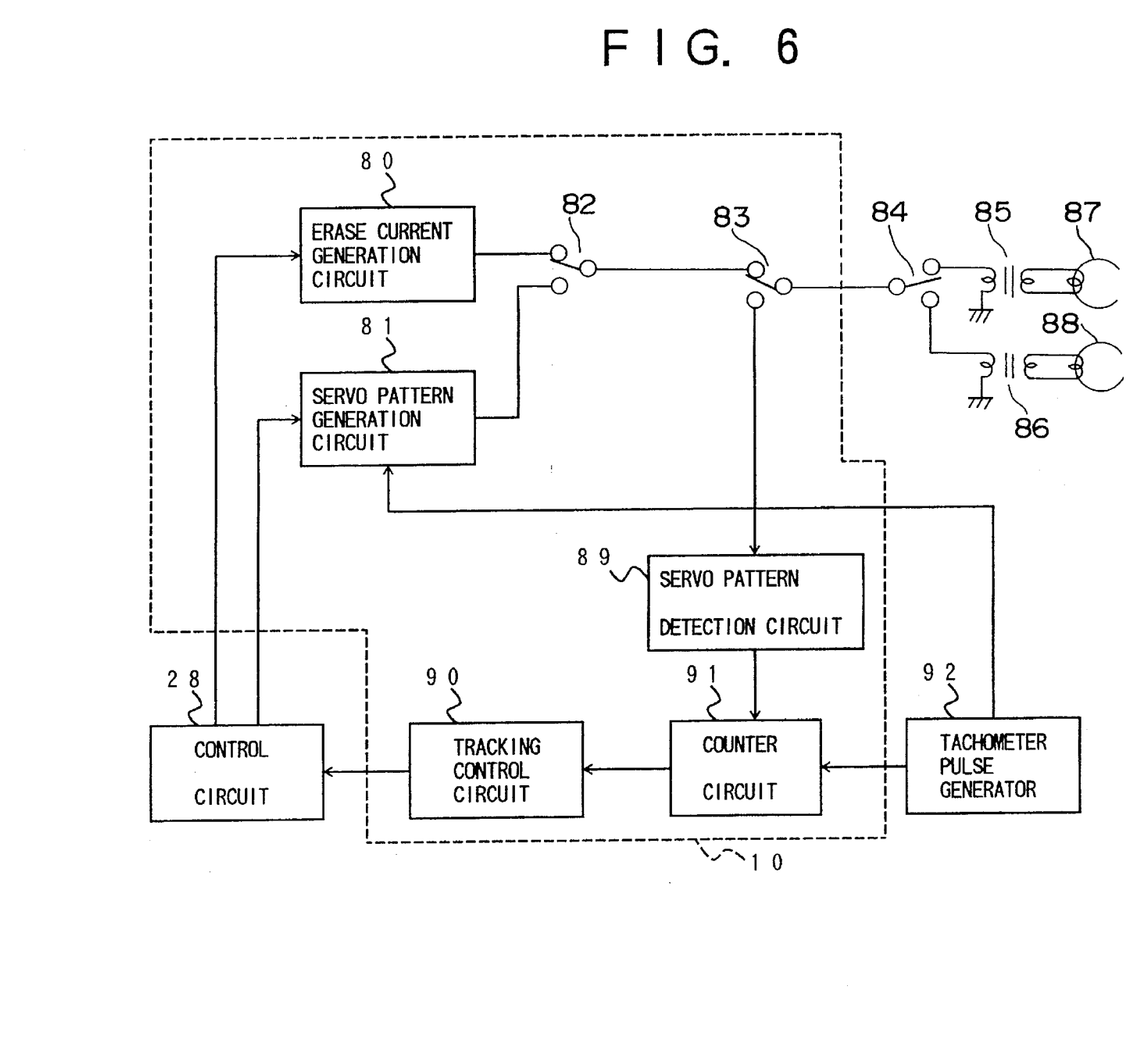
FIG. 6 shows a block diagram of an erase head control circuit.

FIG. 6 shows a block diagram of the erase head control circuit 10, wherein numeral 80 is an erase current generation circuit, numeral 81 is a servo pattern generation circuit, numerals 82 to 84 are change-over switches, numerals 85 and 86 are rotary transformers, numerals 87 and 88 are flying erase heads, numeral 89 is a servo pattern detection circuit, numeral 90 is a tracking control circuit, numeral 91 is a counter circuit, and numeral 92 is a tachometer pulse generator.

The tachometer pulse generator generates a reference signal at a timing at which the flying erase head comes to a predetermined position on the magnetic tape. This timing is determined from the rotation state of the rotary head cylinder.

When the recording operation is performed, in response to an instruction from the control circuit 28, the servo pattern generation circuit 81 determines the recording start position according to the reference signal from the tachometer pulse generator 92 and generates a servo pattern. In response to an instruction from the control circuit 28, the erase current generation circuit 80 generates an erase current. When these two signals are switched by the switch 82, the track pattern shown in FIG. 3 is generated and supplied via the switch 83 to the flying erase head 87, 88.

On the other hand, when the tracking operation is performed before the recording operation or during the playback operation, the servo pattern signals recorded in the recording area for tracking are reproduced by the flying erase head 87, 88. The reproduced servo pattern signals are fed, via the switch 83 switched into the playback mode, into the servo pattern detection circuit 89. The counter circuit 91 measures the timing difference between the flying erase head and the positional relationship on the magnetic tape from the servo pattern signal and the reference signal output by the tachometer pulse generator.

Measurement by the counter circuit 91 will now be described.

Figure 7:
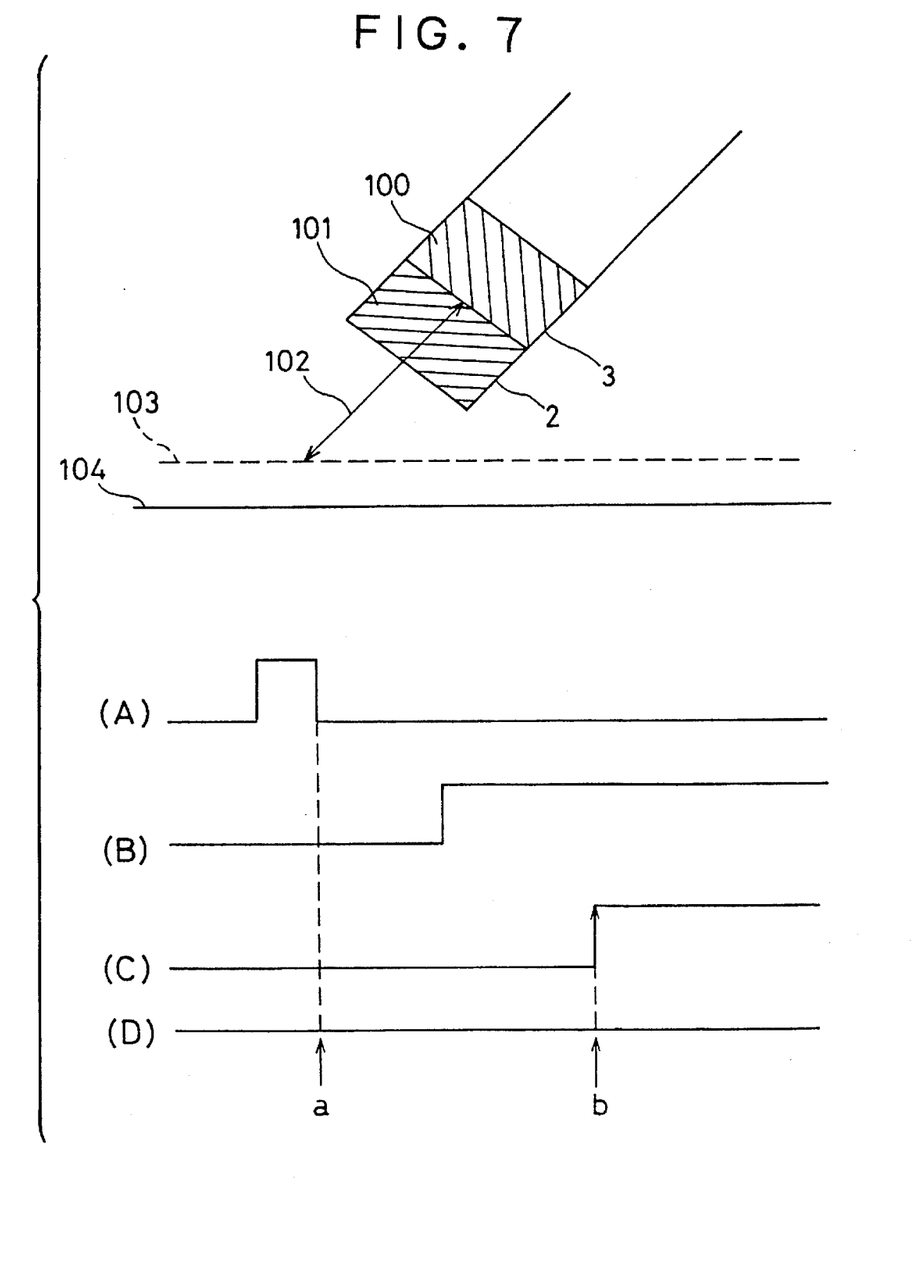
FIG. 7 shows how a track shift amount is detected.

FIG. 7 shows the correspondence between the tracking timing and the actual track, wherein numeral 101 is a first servo pattern recorded in a recording area for tracking 2, numeral 100 is a second servo pattern recorded in a recording area for tracking 3, numeral 102 is a detection distance, numeral 103 is a track pattern reference position, and numeral 104 is a recording tape edge.

The tachometer pulse generator 92 outputs a reference signal shown in (A). The timing a of the signal corresponds to the timing at which the flying erase head is positioned at the track pattern reference position 103. When the flying erase head starts reproducing the first servo pattern, the counter circuit 91 changes the value of the signal as shown in (B). Next, when the flying erase head starts reproducing the second servo pattern, the playback frequency characteristic changes. The counter circuit 91 detects this and changes the value of the signal at a timing b as shown in (C). Then, the counter circuit 91 finds the timing difference between a and b and sends it to the tracking control circuit 90.

Since the timing difference corresponds to the detection distance 102, the tracking control circuit 90 calculates the tracking shift amount from the timing difference detected by the counter circuit 91, and sends this information to the control circuit 28.

Two different servo patterns, namely the first and second servo patterns 101 and 100 recorded in the recording areas for tracking 2 and 3, are respectively recorded for the following reason. Generally, detection of a change point in the playback frequency characteristic can lead to detection of the start point more accurately than direct detection of the start point of a specific playback frequency characteristic from a playback signal. Thus, the first and second servo patterns 101 and 100 are made to be different patterns and a change point in the playback frequency characteristic resulting from reproducing the two patterns is detected for accurate detection of the start point of the second servo pattern 100.

Next, the tracking operation of the data recording and playback apparatus according to the embodiment will be described in detail.

The rotation phase detection circuit 30 detects a rotation phase of the rotary head cylinder 34 and sends it to the control circuit 28.

As described above, during the playback operation, the envelope detection signal from the playback signal processing circuit and the tracking shift amount from the erase head control circuit are input to the control circuit 28, and at the time of the tracking operation before the recording operation, the envelope detection signal from the record signal processing circuit and the tracking shift amount from the erase head control circuit are input to the control circuit 28.

Then, in response to the received tracking shift amount and the received rotation phase of the rotary head cylinder 34, the control circuit 28 sends a correction instruction to the servo circuit 29 so that the tracking shift amount is corrected to a normal value. In response to the received corrected instruction, the servo circuit 29 sends a control signal to each of the capstan control circuit 31 and the reel control circuit 32. In response to the received control signal, the capstan control circuit 31 and the reel control circuit 32 control the capstan 35 and the reel 36 for tracking.

Next, the control circuit 28 uses the received envelope detection signal for fine adjustment of tracking. That is, the control circuit 28 uses the envelope detection signal to again check the tracking shift by the dither method or the like, and then, based on the result, controls the capstan 35 and the reel 36 through the servo circuit 29, the capstan control circuit 31, and the reel control circuit 32 for readjustment of tracking.

Given below is supplementary information about the recording operation and playback operation of the data recording and playback apparatus according to the embodiment.

Figure 8:
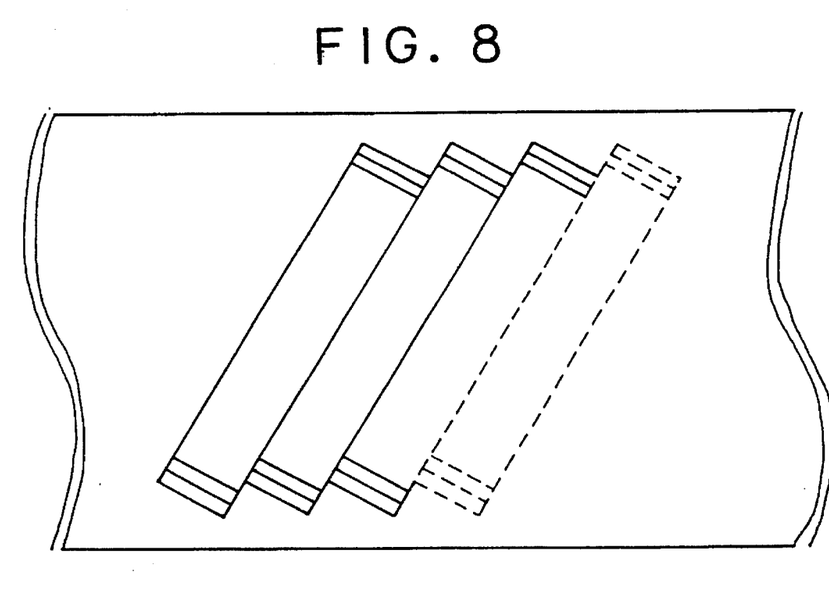
FIG. 8 shows how contiguous recording is performed.

FIG. 8 is a drawing for illustrating contiguous recording.

Contiguous recording is for recording data on a new track contiguous to tracks on which data is already recorded. The track indicated by the dotted lines in FIG. 8 is a new recording track. As described above, before the recording operation, tracking is performed up to the new recording track position according to the tracks where data is already recorded, and then the recording operation is performed. Servo patterns are recorded in recording areas for tracking 2 and 3 (see FIG. 3) for the new recording track by the flying erase head, the recording area for flying erase 6 is generated, and then data is recorded on the data tracks 7 and 8.

Figure 9:
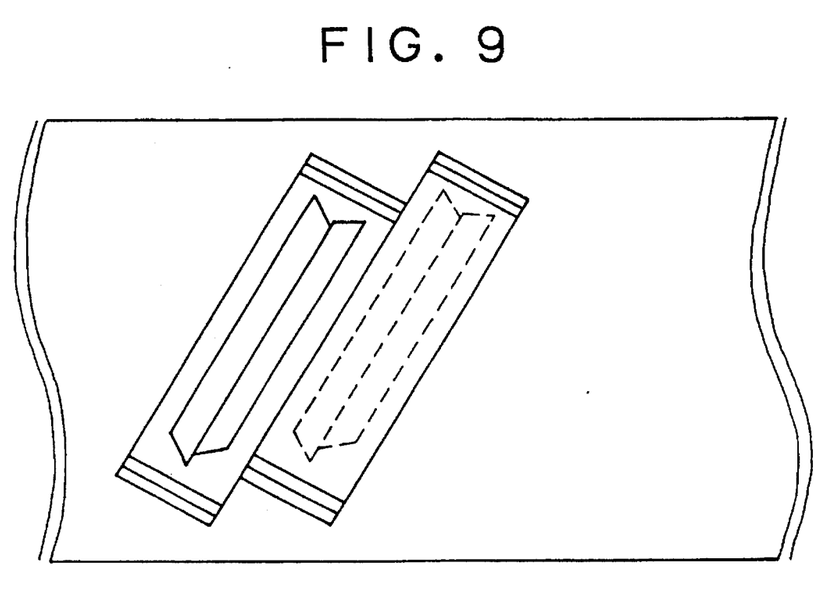
FIG. 9 shows how insertion recording is performed.

FIG. 9 is a drawing for illustrating insertion recording.

Insertion recording is for writing new data on tracks on which data is already recorded.

The data tracks indicated by the dotted lines in FIG. 9 are new data tracks where insertion recording is performed. In this case, as with the contiguous recording described above, before the recording operation, tracking is performed up to the insertion track position according to the tracks where data is already recorded, then the recording operation is performed for rewriting the data. In the insertion recording in the embodiment, the servo patterns in the recording areas for tracking 2 and 3 are not rewritten and the data already recorded on the old data track is erased by the flying erase head and new data is written onto the data track, thereby removing any tracking error. Since new data is written after erasure, a guard band can be provided to prevent data errors caused by overwriting. Tracking shift is prone to occur in the insertion recording. Even if tracking shift occurs, the error rate can be prevented from being raised because a guard band described above is provided between data track pairs adjacent to each other.

Figure 10:
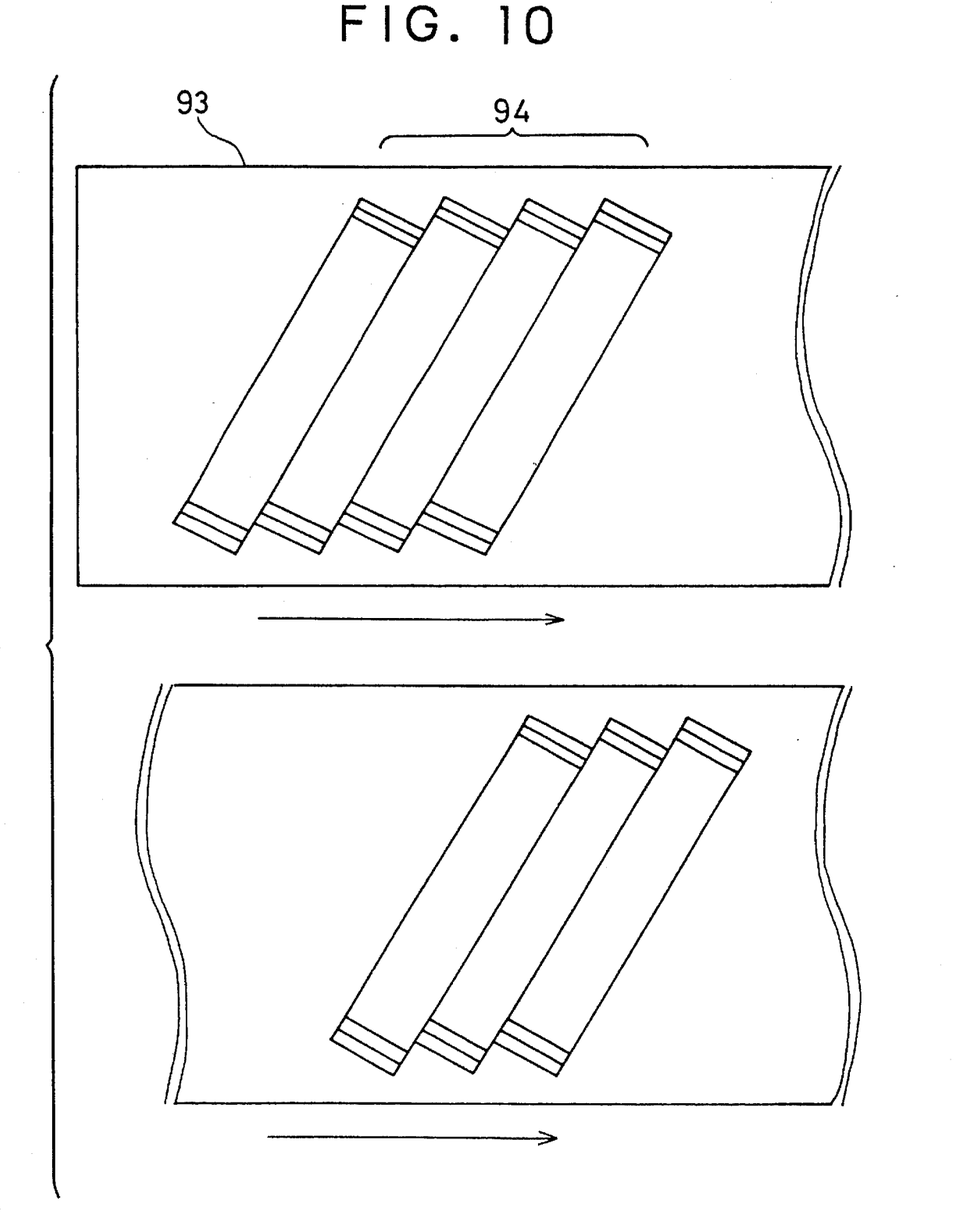
FIG. 10 illustrates recording and playback using reference tracks.

FIG. 10 is a drawing for illustrating recording and playback using reference tracks, wherein numeral 93 is recording tape and numeral 94 is a reference track pattern. The reference track pattern provides reference tracks previously recorded at the beginning position of the recording tape as shown in FIG. 10. At the time of recording or playback, the reference track pattern is always reproduced and according to the result, correction of head mount precision such as the head mount height is set in a subsequent control operation, thereby enabling the subsequent tracking to be executed accurately and rapidly.

Thus, the data recording and playback apparatus according to the embodiment enables stable tracking to be executed with a large guard band to prevent a large error rate and at high precision.

Figure 11:
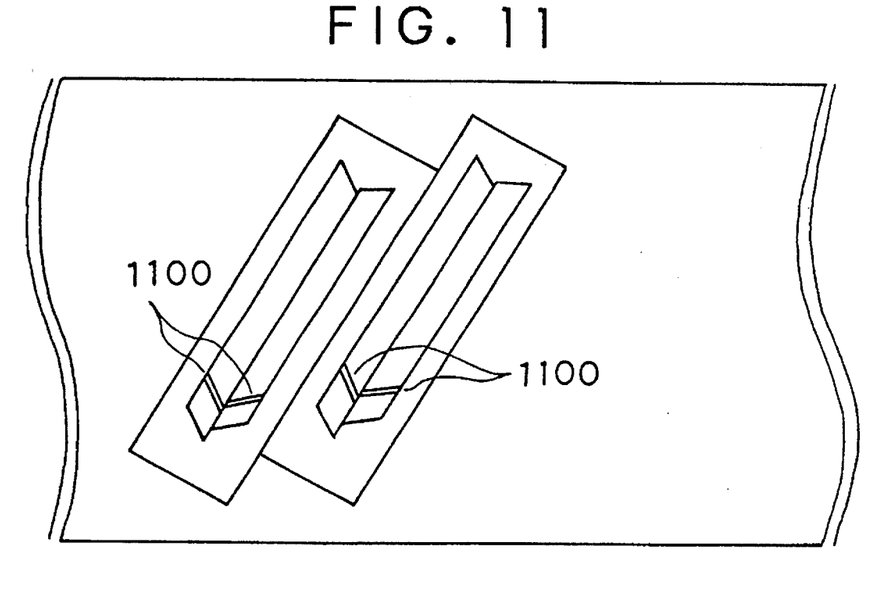
FIG. 11 shows a format of data tracks on which specific patterns are recorded.

In some data recording formats, a specific pattern 1100 may be recorded at a predetermined position on each of the data tracks 7 and 8 of the recording tape 1, as shown in FIG. 11. For the magnetic tape adopting such a recording format, tracking may be performed in response to reproduction timings of the specific patterns on the data tracks 7 and 8 by the playback head without providing the recording areas for tracking 2–5 in FIG. 3 in which the servo patterns are recorded. Instead of the servo pattern reproduction timing, the reproduction timing of the specific pattern 1100 on each of the data tracks 7 and 8 read by the playback head and the reference signal output by the tachometer pulse generator are used to measure the timing difference between the playback or recording head and the positional relationship on the recording tape and the timing difference is corrected.

Thus, the data recording and playback apparatus according to the embodiment enables stable tracking to be executed with a large guard band provided to lower an error rate and at high precision.

To improve the recording density of the recording tape, the recording track width should be made narrower. For example, if the track width is halved, the number of recording tracks that can be provided on one recording tape can be approximately doubled, and thus the recording density can be approximately doubled. Preferably, the track width should be narrowed as much as possible in the recording formats shown in FIG. 3, etc.

Preferably, data recording and playback apparatuses which support recording formats with such narrow track widths have capabilities of at least playing back magnetic tapes using other recording formats with wider recording track widths.

Described below is a data recording and playback apparatus according to the embodiment which plays back recording tape in another recording format using data tracks wider than the data tracks 7 and 8 in the recording format shown in FIG. 3.

Playback of data recorded in a format equivalent to the D2 format which is an existing recording format used for digital video tape recorders is taken as an example.

Figure 12A:
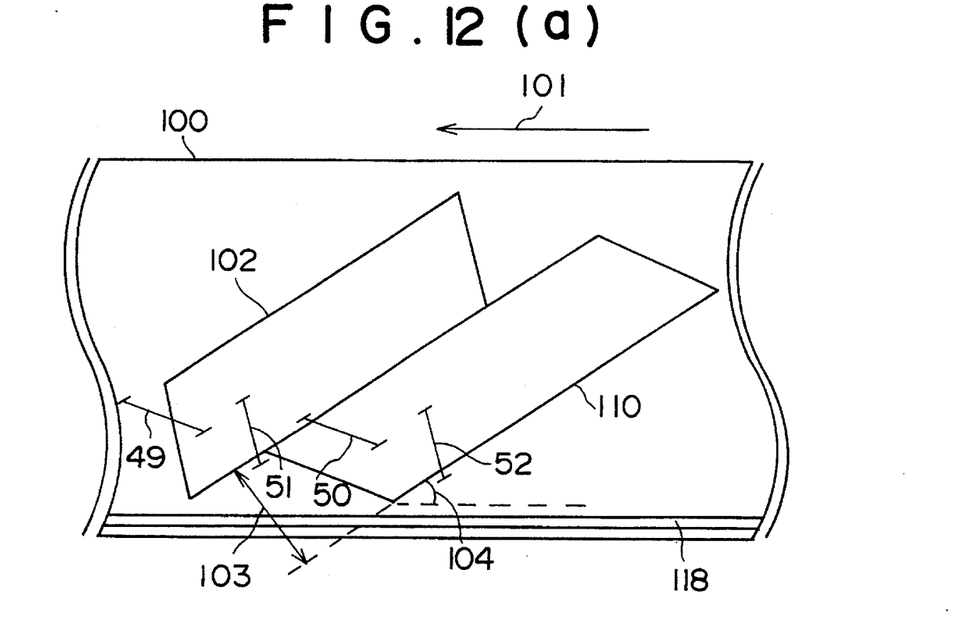
FIG. 12(a) and FIG. 12(b) show formats of data tracks whose track widths are wide and narrow, respectively.

The existing recording format is shown in FIG. 12(a), wherein numeral 100 is recording tape, numeral 101 is the tape feed direction, numeral 102 is a data track of a positive recording azimuth, numeral 110 is a data track of a negative recording azimuth, numeral 103 is the track width of the data track, numeral 104 is a helix angle, and numeral 118 is a control track which is a linear track. Control signals recorded on the control track 118 include timing signals that can be used for tracking.

Figure 12B:
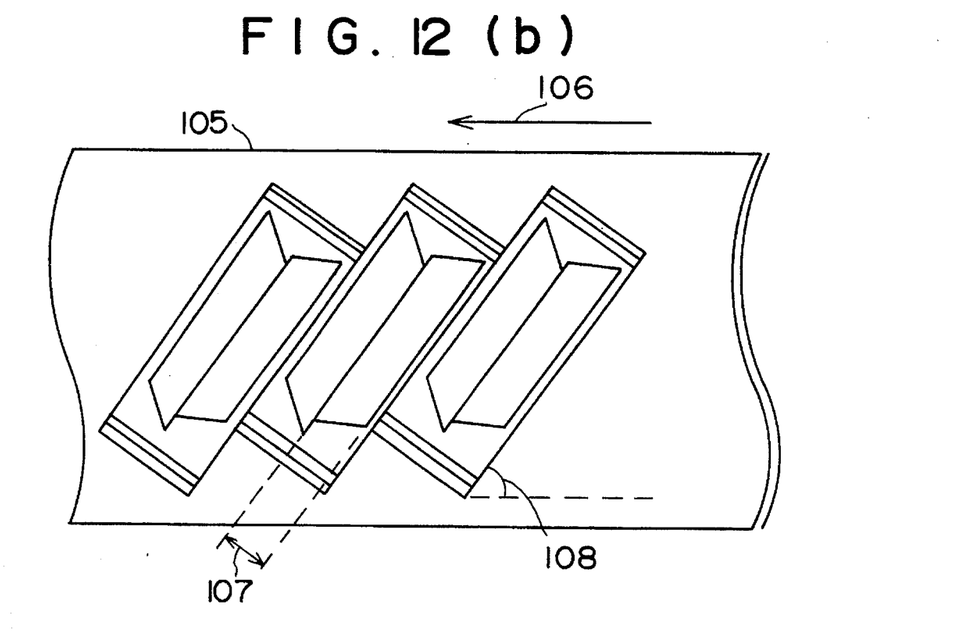

The same recording format as shown in FIG. 3 normally used by the data recording and playback apparatus according to the embodiment is shown in FIG. 12(b), wherein numeral 107 is the data track width. In the description to follow, the width 107 is assumed to be half of the data track width 103 in the recording format shown in FIG. 12(a) as an example. Numeral 108 is a helix angle.

The playback operation of the recording tape in the recording format shown in FIG. 12(a) will be described with the playback heads 49 and 50 as the playback heads for positive azimuth and the playback heads 51 and 52 as the playback heads for negative azimuth.

In this example, one data track must be traced by two playback heads which differ in azimuth. That is, the data track of a positive azimuth 102 is traced by the playback head 49 for positive azimuth and the playback head 51 for negative azimuth and the data track of a negative azimuth 110 is traced by the playback head 50 for positive azimuth and the playback head 52 for negative azimuth, thereby reproducing data alternately by the playback heads 49 and 52 tracing the data tracks of the same azimuths as the playback heads at given tracking.

If such playback operation is performed at the same tape speed as the playback operation in the recording format shown in FIG. 12(b), the data playback speed is halved. To make the data playback speed unchanged, the tape speed should be accelerated. In this case, however, the helix angle 104 also changes. To conform to the change, the rotation speed of the rotary head cylinder 34 or the tape winding angle should also be changed.

A tracking operation different from the tracking operation for the recording format shown in FIG. 12(b) is required to position each of the pair of the playback head 49 for positive azimuth and the playback head 51 for negative azimuth and the pair of the playback head 50 for positive azimuth and the playback head 52 for negative azimuth on one data track. This is because positions deviating from the center of the data track must be traced by each playback head.

The tracking operation will now be described.

First, tracking is performed according to the predetermined timing provided by reproducing the control signal recorded on the control track 118 and the timing with the tachometer pulse described above, or in the recording format where a specific pattern is recorded at a predetermined position on a data track, tracking is performed according to the reproduction timing of the specific pattern and the timing with the tachometer pulse.

Figure 13:
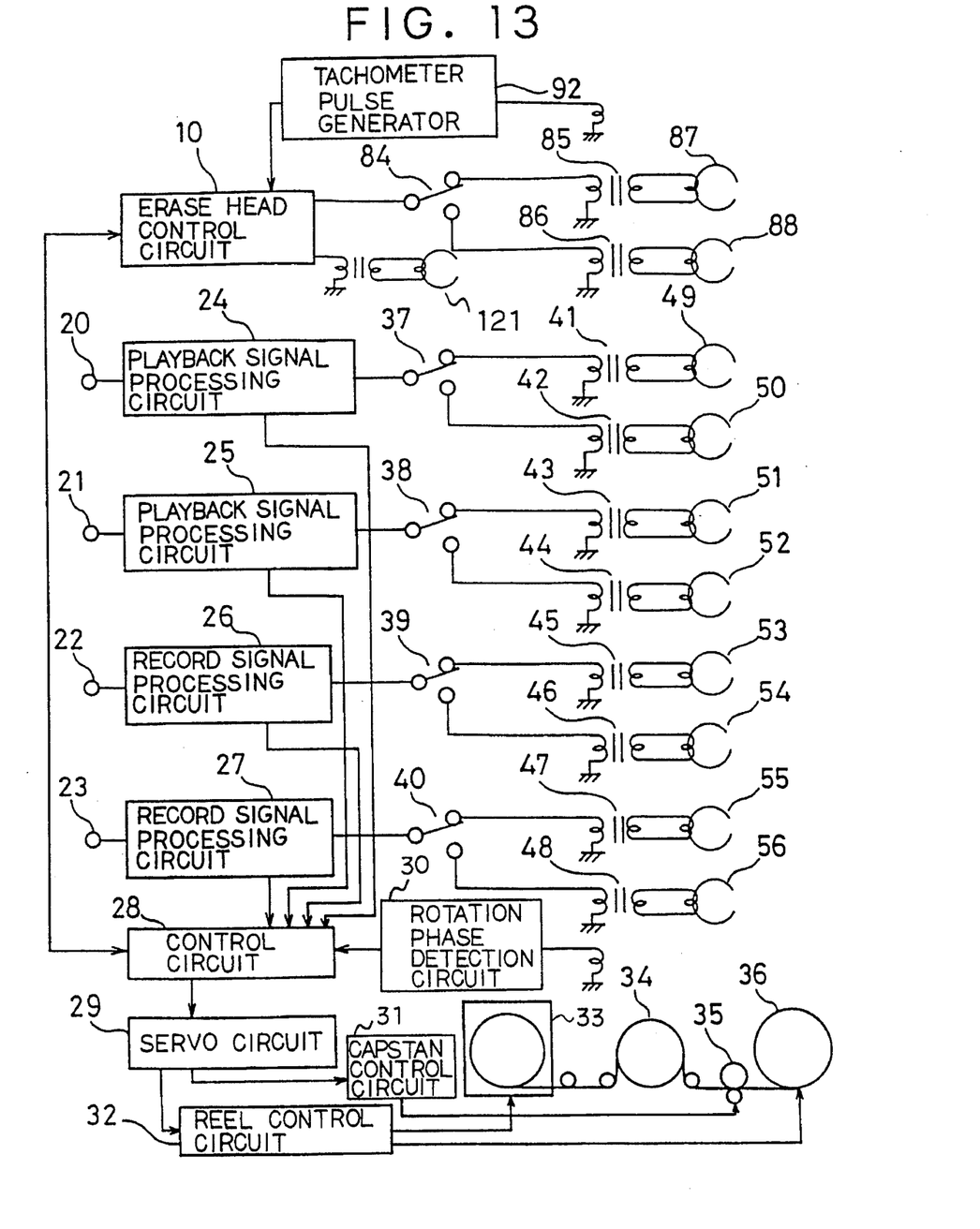
FIG. 13 shows the configuration of a data recording and playback apparatus provided with a control track playback head.

Since the control track 118 is a linear track, a special head is required to reproduce the track. To use the control track for tracking, a head 121 for the control track should be installed as shown in FIG. 13. The signal reproduced by the head 121 is sent to the erase head control circuit 10 and the difference between the predetermined timing appearing in the reproduced signal and the timing with the tachometer pulse is calculated.

To perform tracking with the specific pattern at the predetermined position on the data track, highly reliable tracking can be performed by using the playback signal of the specific pattern by the playback head whose playback signal level (envelope) is highest at that time.

Upon termination of the tracking using the control track or specific pattern, then the playback signal level (envelope) of each playback head is used for fine adjustment of tracking. That is, tracking is performed so that the two playback signal levels of either the playback head pair of 49 and 52 or of the pair of 51 and 50 are equal to each other and maximized, or so that both the playback signal levels are a given value or greater, thereby positioning each of the pair of the playback head 49 for positive azimuth and the playback head 51 for negative azimuth and the pair of the playback head 50 for positive azimuth and the playback head 52 for negative azimuth on one data track. If three or more pairs of playback heads are used or the width of the data track in the recording format shown in FIG. 12(a) is not twice that of the data track shown in FIG. 12(b), a playback operation can be performed in a similar manner. The reference tracks described above can also be used for higher reliability tracking.

Thus, according to the invention, there is provided a data recording and playback apparatus using the helical scan system which can record and play back general digital data on magnetic tape at high density and high reliability without using linear tracks for tracking.

What is claimed is:

1. A data recording and playback apparatus using a helical scan system for recording and playing back data on a magnetic tape with a rotary head cylinder, said apparatus comprising:

a first magnetic head on the rotary head cylinder for scanning a recording track on said magnetic tape;

a recording magnetic head on the rotary head cylinder for scanning a data track within said recording track;

a playback magnetic head on the rotary head cylinder for scanning said data track;

means for recording a specific pattern in a tracking area within said recording track with said first magnetic head during a data recording operation of said apparatus, said tracking area not overlapping said data track;

means for recording data in said data track with said recording magnetic head during said data recording operation;

reference signal generating means for generating a reference signal at a timing indicative of a predetermined rotation phase of said rotary head cylinder;

means for playing back the data in said data track with said playback magnetic head during a data playback operation of said apparatus;

means for playing back said specific pattern in said tracking area with said first magnetic head during the data playback operation; and tracking control means for detecting a difference between a playback timing of said specific pattern indicative of a timing at which said specific pattern is played back by said first magnetic head and the timing at which said reference signal is generated by said reference signal generating means, and for controlling tracking of said first magnetic head, said recording magnetic head, and said playback magnetic head based on said difference.

2. A data recording and playback apparatus as claimed in claim 1, wherein said first magnetic head has a different azimuth than said recording magnetic head and said playback magnetic head.

3. A data recording and playback apparatus as claimed in claim 2, wherein said recording track is any one of a plurality of recording tracks on said magnetic tape, and wherein a guard band is provided between data tracks belonging to adjacent ones of said recording tracks.

4. A data recording and playback apparatus as claimed in claim 1, wherein said recording track is any one of a plurality of recording tracks on said magnetic tape, and wherein a guard band is provided between data tracks belonging to adjacent ones of said recording tracks.

5. A data recording and playback apparatus as claimed in claim 1, wherein said means for recording a specific pattern records said specific pattern by consecutively recording two different patterns providing different playback characteristics in said tracking area with said first magnetic head during said data recording operation;

wherein said means for playing back said specific pattern plays back said specific pattern by playing back said two different patterns in said tracking area with said first magnetic head during said data playback operation, said different playback characteristics provided by said two different patterns causing a playback characteristic of said specific pattern to change when said means for playing back said specific pattern plays back said specific pattern; and wherein said tracking control means detects said difference between a playback timing of said specific pattern indicative of a timing at which said specific pattern is played back by said first magnetic head and the timing at which said reference signal is generated by said reference signal generating means by detecting a difference between a timing at which said playback characteristic of said specific pattern changes and the timing at which said reference signal is generated, and controls the tracking of said first magnetic head, said recording magnetic head, and said playback magnetic head based on the detected difference.

6. A data recording and playback apparatus as claimed in claim 1, further comprising:

means for using said recording magnetic head or said playback magnetic head to play back previously recorded data recorded in said data track in a previous data recording operation to produce a previously recorded data playback signal before a new data recording operation is started;

wherein said tracking control means is responsive to said previously recorded data playback signal and controls tracking of said first magnetic head, said recording magnet head, and said playback magnetic head so that a level of said previously recorded data playback signal is maximized.

7. A data recording and playback apparatus as claimed in claim 1, wherein said first magnetic head is a flying erase head, and wherein during said data recording operation, said means for recording said specific pattern uses said flying erase head to record said specific pattern in said tracking area, and uses said flying erase head to record an erase signal in an area of said recording track other than said tracking area.

8. A data recording and playback apparatus as claimed in claim 1, wherein said first magnetic head is a flying erase head, and wherein during said data recording operation, said means for recording said specific pattern, if said specific pattern is already recorded in said tracking area of a recording track containing a data track on which data is to be recorded, uses said flying erase head to record an erase signal in an area within said recording track other than said tracking area.

9. A data recording and playback apparatus as claimed in claim 1, wherein the magnetic tape has a reference track recorded thereon at a beginning of the magnetic tape, the reference track including a tracking area having the specific pattern recorded therein; and wherein the data recording and playback apparatus further comprises:

means for playing back the specific pattern in the tracking area of the reference track with the first magnetic head before the data recording operation and the data playback operation; and adjusting means for detecting a difference between a playback timing of the specific pattern of the reference track indicative of a timing at which the specific pattern of the reference track is played back by the first magnetic head and the timing at which the reference signal is generated by the reference signal generating means, and for adjusting the tracking control means based on the difference.

10. A data recording and playback apparatus as claimed in claim 9, wherein the adjusting means adjusts the tracking control means such that the difference between the playback timing of the specific pattern of the recording track and the timing at which the reference signal is generated is equal to the difference between the playback timing of the specific pattern of the reference track and the timing at which the reference signal is generated.

11. A data recording and playback apparatus using a helical scan system for recording and playing back data on a magnetic tape with a rotary head cylinder, said apparatus comprising:

a first magnetic head on the rotary head cylinder for scanning a recording track on said magnetic tape;

two recording magnetic heads on the rotary head cylinder for scanning in parallel two data tracks within said recording track;

two playback magnetic heads on the rotary head cylinder for scanning in parallel said two data tracks;

means for recording a specific pattern in a tracking area within said recording track with said first magnetic head during a data recording operation of said apparatus, said tracking area not overlapping said two data tracks;

means for recording data in parallel in said two data tracks with said two recording magnetic heads during said data recording operation;

reference signal generating means for generating a reference signal at a timing indicative of a predetermined rotation phase of said rotary head cylinder;

means for playing back the data in said two data tracks in parallel with said two playback magnetic heads during a data playback operation of said apparatus;

means for playing back said specific pattern in said tracking area with said first magnetic head during the data playback operation; and tracking control means for detecting a difference between a playback timing of said specific pattern indicative of a timing at which said specific pattern is played back by said first magnetic head and the timing at which said reference signal is generated by said reference signal generating means, and for controlling tracking of said first magnetic head, said two recording magnetic heads, and said two playback magnetic heads based on said difference.

12. A data recording and playback apparatus as claimed in claim 11, wherein said recording track is any one of a plurality of recording tracks on said magnetic tape, and wherein a guard band is provided between data tracks belonging to adjacent ones of said recording tracks.

13. A data recording and playback apparatus as claimed in claim 12, wherein said two recording magnetic heads have mutually different azimuths; and wherein each playback magnetic head of said two playback magnetic heads has the same azimuth as a respective one of the two recording magnetic heads which scans the same data track as the playback magnetic head.

14. A data recording and playback apparatus as claimed in claim 13, wherein said first magnetic head has a different azimuth than said two recording magnetic heads and said two playback magnetic heads.

15. A data recording and playback apparatus as claimed in claim 12, wherein said first magnetic head has a different azimuth than said two recording magnetic heads and said two playback magnetic heads.

16. A data recording and playback apparatus as claimed in claim 12, wherein said means for recording specific pattern records said specific pattern by consecutively recording two different patterns providing different playback characteristics in said tracking area with said first magnetic head during said data recording operation;

wherein said means for playing back said specific pattern plays back said specific pattern by playing back said two different patterns in said tracking area with said first magnetic head during said data playback operation, said different playback characteristics provided by said two different patterns causing a playback characteristic of said specific pattern to change when said means for playing back said specific pattern plays back said specific pattern; and wherein said tracking control means detects said difference between a playback timing of said specific pattern indicative of a timing at which said specific pattern is played back by said first magnetic head and the timing at which said reference signal is generated by said reference signal generating means by detecting a difference between a timing at which said playback characteristic of said specific pattern changes and the timing at which said reference signal is generated, and controls the tracking of said first magnetic head, said two recording magnetic heads, and said two playback magnetic heads based on the detected difference.

17. A data recording and playback apparatus as claimed in claim 11, further comprising:

means for using said two recording magnetic heads or said two playback magnetic heads to play back previously recorded data recorded in said two data tracks in a previous data recording operation to produce two previously recorded data playback signals before a new data recording operation is started;

wherein said tracking control means is responsive to said two previously recorded data playback signals and controls tracking of said first magnetic head, said two recording magnetic heads, and said two playback magnetic heads so that respective levels of said two previously recorded data playback signals are maximized.

18. A data recording and playback apparatus as claimed in claim 11, wherein said first magnetic head is a flying erase head, and wherein during said data recording operation, said means for recording said specific pattern uses said flying erase head to record said specific pattern in said tracking area, and uses said flying erase head to record an erase signal in an area of said recording track other than said tracking area.

19. A data recording and playback apparatus as claimed in claim 11, wherein said first magnetic head is a flying erase head, and wherein during said data recording operation, said means for recording said specific pattern, if said specific pattern is already recorded in said tracking area of a recording track containing data tracks on which data is to be recorded, uses said flying erase head to record an erase signal in an area within said recording track other than tracking area.

20. A data recording and playback apparatus as claimed in claim 11, wherein the magnetic tape has a reference track recorded thereon at a beginning of the magnetic tape, the reference track including a tracking area having the specific pattern recorded therein; and wherein the data recording and playback apparatus further comprises:
means for playing back the specific pattern in the tracking area of the reference track with the first magnetic head before the data recording operation and the data playback operation; and adjusting means for detecting a difference between a playback timing of the specific pattern of the reference track indicative of a timing at which the specific pattern of the reference track is played back by the first magnetic head and the timing at which the reference signal is generated by the reference signal generating means, and for adjusting the tracking control means based on the difference.

21. A data recording and playback apparatus as claimed in claim 20, wherein the adjusting means adjusts the tracking control means such that the difference between the playback timing of the specific pattern of the recording track and the timing at which the reference signal is generated is equal to the difference between the playback timing of the specific pattern of the reference track and the timing at which the reference signal is generated.

22. A data recording and playback apparatus using a helical scan system for recording and playing back data on a magnetic tape with a rotary head cylinder, said apparatus comprising:

a magnetic head on the rotary head cylinder for scanning tracks on said magnetic tape; and means for using said magnetic head for playing back reference tracks on which a specific pattern has been previously recorded at a beginning of said magnetic tape before target data is recorded or played back, said means being responsive to a playback state of said reference tracks for adjusting tracking of tracks on said magnetic tape other than said reference tracks before target data is recorded or played back.

23. A data recording and playback apparatus as claimed in claim 22, wherein the means adjusts the tracking of the tracks other than the reference tracks such that a recording or playback state of the tracks other than the reference tracks when the target data is recorded or played back is the same as the playback state of the reference tracks.

* * * * *